Oct. 15, 1968 M. IMMENDÖRFER ET AL 3,406,048
EPITAXIAL DEPOSITION OF GALLIUM ARSENIDE FROM AN ATMOSPHERE OF HYDROGEN AND $Ga_2H_6 + AsCl_3 + AsH_3$ VAPORS
Filed July 29, 1964
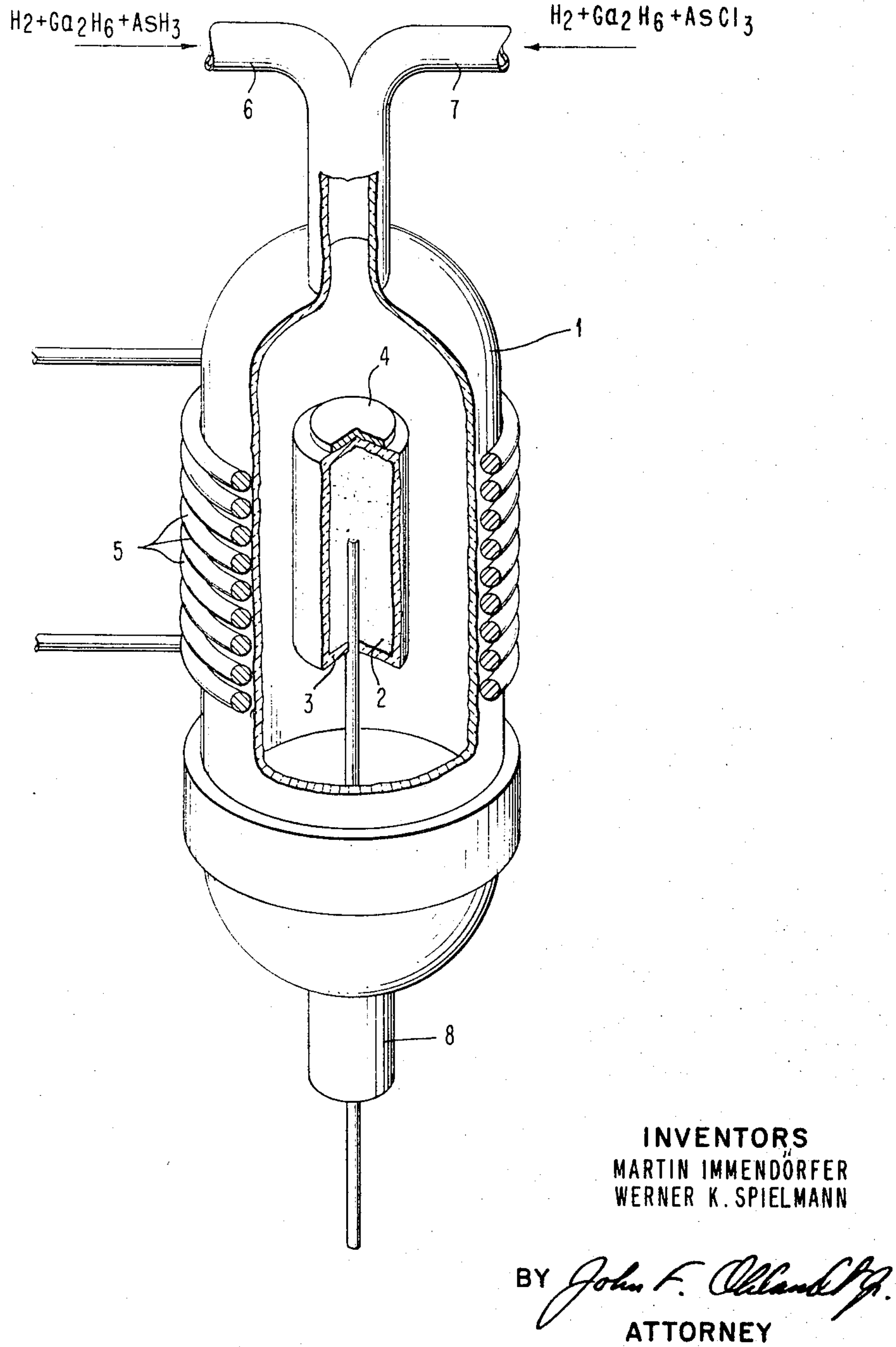
INVENTORS
MARTIN IMMENDÖRFER
WERNER K. SPIELMANN
BY John F. Ohlandt Jr.
ATTORNEY United States Patent Office 3,406,048

Patented Oct. 15, 1968

3,406,048

EPITAXIAL DEPOSITION OF GALLIUM ARSENIDE FROM AN ATMOSPHERE OF HYDROGEN AND $Ga_2H_6+AsCl_3+AsH_3$ VAPORS

Martin Immendörfer, Sindelfingen, and Werner K. Spielmann, Dachtel, Post Deufringen, Germany, assignors to International Business Machines Corporation, New York, N.Y., a corporation of New York Filed July 29, 1964, Ser. No. 385,948
Claims priority, application Germany, Aug. 1, 1963, J 24,172
4 Claims. (Cl. 148—175)

This invention relates to a method of producing high-purity gallium arsenide, preferably in the form of epitaxial layers. It is particularly suitable for producing semiconductor elements, such as transistors, semiconductor diodes, semiconductor rectifiers or semiconductor cooling and/or Peltier elements.

In a prior art process of producing high-purity epitaxial gallium arsenide layers, GaAs is first converted into the gaseous phase and then, by means of a transport gas, conveyed to the seeds or surfaces to be coated, where it is precipitated by disproportionation processes and epitaxially deposited on such surfaces. In this procedure, the GaAs serving as the source material is disintegrated partly by high temperature, partly by reaction with the transport gas. In the region of the seeds to be coated, the balance is so displaced by reducing the temperature that part of the GaAs precipitates.

This prior art method has a number of serious disadvantages. First, the production of high-purity gallium arsenide, such as is required e.g. in fabricating semiconductor elements, is very difficult and expensive. Moreover, during the above indicated procedure the highly pure material available tends to absorb impurities, which is particularly due to the high operating temperature. As the deposited layers cannot be purer than the source material, that fact is of great disadvantage.

Another shortcoming resides in the high temperatures required in the aforementioned procedure, as that causes blurring of the interfaces between the seed material and the material grown thereon due to diffusion.

As during the disproportionation step only part of the source material precipitates, the above procedure is very uneconomical, which is of special importance in view of the high cost of GaAs. Moreover, the material precipitating during the disproportionation step deposits not only on the seeds but also on the walls of the reaction chamber, thus resulting not only in a further efficiency deterioration and a poor reproducibility of the deposited layers but also in the necessity of a frequent replacement of the reaction chamber.

This invention has for its object to eliminate the above mentioned shortcomings by providing a method in which cheaper basic substances that are easier to produce with a high degree of purity are utilized, in which an important loss of material does not occur, and in which the reproducibility of the grown epitaxial layers, which by the way are produced only on the seeds provided therefor and on predetermined areas of those seeds, is well controlled.

Another object of this invention resides in controlling the sharpness of the transitions between the seed surface and the epitaxial layer grown thereon with simple means and within wide limits without requiring any changes in temperature.

The foregoing and other objects, features and advantages of the invention will be apparent from the following more particular description of preferred embodiments of the invention, as illustrated in the accompanying drawing.

In the drawing:

The figure is a schematic diagram of apparatus employed for the practice of the present invention.

The above objects are realized in accordance with this invention by a method of producing high-purity gallium arsenide, preferably in the form of epitaxial layers, wherein gallium and arsenic compounds, which each by themselves are easier to produce with a high degree of purity than gallium arsenide, such as $Ga_2H_6$, $AsCl_3$ and $AsH_3$, are reacted with each other. The method may be used to advantage especially if the substances reacting with each other are either gaseous at room temperature or liquid at a relatively high vapor pressure. In order to prevent the substance to be grown from precipitating also on other than the surfaces provided therefor, the substances to be reacted with each other are chosen so that the reaction takes place above the pyrolytic disintegration temperature. In this manner, it is possible to direct the gaseous mixture into a reaction chamber the temperature of which is above the pyrolytic disintegration temperature, and to control the selection of the areas to be coated as well as the speed of precipitation by selectively heating those areas to the pyrolytic disintegration temperature or to a higher temperature.

In accordance with a particularly advantageous embodiment of this invention, a gas mixture which when grown epitaxially results in sharp transitions between the seed and the layer grown thereon, such as $Ga_2H_6+2AsH_3$, and a gas mixture which when grown epitaxially results in vague transitions, such as $Ga_2H_6+2AsCl_3$, is introduced into the reaction chamber in a controllably determinable or variable proportion. The varying degree of sharpness in the transitions results from the fact that e.g. $AsCl_3$, in contrast to $AsH_3$, affects and erodes the seed or the previously deposited material, so that the speed of growth is the difference between the speed of deposition and the speed of erosion. By properly selecting the proportions of the said two substances and, if required, by suitably determining the temperature, it is possible to vary the degrees of sharpness of the transitions within very wide limits. This possibility is very important especially in the fabrication of semiconductor elements, as in this manner it is possble to produce PN junctions of any desired width by growing, for example, on a seed doped with P type impurities an epitaxial layer doped with N type impurities. By selectively heating the surfaces to be coated, the growth of the epitaxial layer is limited to certain areas having any desired configuration, which are, so to speak, determined by a thermal mask. Heating may be effected by electron beams, infrared radiation, inductive heating, etc.

The invention will now be explained in detail in conjunction with an embodiment thereof: Referring now to the figure, in the reaction chamber 1, which may e.g. consist of quartz, there is placed the graphite block 2 which is coated with a thin quartz layer 3. The graphite block 2 has placed thereon the GaAs wafer 4 to be coated which, by heating the block 2 by means of induction windings 5, is heated to approximately 600° C. Through the pipes 6 and 7 a gas mixture comprising $H_2+Ga_2H_6+AsCl_3$ or $H_2+Ga_2H_6+AsH_3$ in a given ratio is introduced, said mixture having a temperature of approximately 20° C. When passing over the GaAs wafer 4 heated to 600° C., this mixture, the pyrolytic disintegration temperature of which is approximately 100° C., is decomposed. The separated GaAs will then grow on the wafer 4 as an epitaxial layer. The sharpness of the transition is determined by the ratio of $AsCl_3$ and $AsH_3$. The gas mixture flowing out through the pipe 8 may, if it still contains GaAs, be directed into an additional reaction chamber.

While the invention has been particularly shown and described with reference to preferred embodiments thereof, it will be understood by those skilled in the art that various changes in form and details may be made therein without departing from the spirit and scope of the invention.

What is claimed is:

1. Method of producing epitaxially a layer of gallium arsenide on a doped seed in a reaction chamber comprising the steps of:

introducing an atmosphere containing at least hydrogen and $Ga_2H_6+AsCl_3+AsH_3$ vapors, at a temperature below the pyrolytic disintegration temperature of said vapors;

proportioning the relative amounts of $AsH_3$ to $AsCl_3$ in said atmosphere so that a predetermined sharpness is obtained in the transition of the doping levels between said seed and said layer, the sharpness of said transition increasing as the proportion of $AsH_3$ to $AsCl_3$ increases;

and selectively heating said seed to a temperature higher than said pyrolytic disintegration temperature whereby a layer of gallium arsenide is deposited on said seed.

2. Method as set forth in claim 1 wherein said vapors are introduced at temperature of approximately 20° C.

3. Method as set forth in claim 1 wherein said doped seed is heated to a temperature of approximately 600° C.

4. Method as set forth in claim 2 wherein said doped seed is heated to a temperature of approximately 600° C.

References Cited

UNITED STATES PATENTS

| | | |
|---|---|---|
| 3,160,521 | 12/1964 | Ziegler et al. |
| 3,218,205 | 11/1965 | Ruehrwein. |

OTHER REFERENCES

IBM Technical Disclosure Bulletin, vol. 4, No. 1, June 1961.

Journal of the Electrochem. Society, p. 70C, March 1962.

L. DEWAYNE RUTLEDGE, *Primary Examiner.*

P. WEINSTEIN, *Assistant Examiner.*